(12) United States Patent
Yanoff et al.

(10) Patent No.: US 10,058,753 B2
(45) Date of Patent: Aug. 28, 2018

(54) CUSTOMIZABLE SPORTING EQUIPMENT COVER AND METHOD OF MANUFACTURE

(75) Inventors: Jonathan Yanoff, Delray Beach, FL (US); Glenn Yanoff, Delray Beach, FL (US)

(73) Assignee: CRACKERJACK SYSTEMS INC., Delray Beach, FL (US)

(*) Notice: Subject to any disclaimer, the term of this patent is extended or adjusted under 35 U.S.C. 154(b) by 789 days.

(21) Appl. No.: 13/443,252

(22) Filed: Apr. 10, 2012

(65) Prior Publication Data

US 2012/0261043 A1     Oct. 18, 2012

Related U.S. Application Data

(60) Provisional application No. 61/474,533, filed on Apr. 12, 2011.

(51) Int. Cl.
| | |
|---|---|
| *A63B 57/00* | (2015.01) |
| *A63B 60/62* | (2015.01) |
| *A63B 60/58* | (2015.01) |
| *B33Y 80/00* | (2015.01) |
| *A63B 71/06* | (2006.01) |

(52) U.S. Cl.
CPC .............. *A63B 60/62* (2015.10); *A63B 60/58* (2015.10); *A63B 2071/0694* (2013.01); *A63B 2209/08* (2013.01); *A63B 2209/10* (2013.01); *A63B 2210/50* (2013.01); *B33Y 80/00* (2014.12)

(58) Field of Classification Search
CPC ...... B65D 81/3886; B65D 1/06; B65D 25/34; A61G 5/10; E04G 21/30
USPC .............. 150/154, 160; 220/694; 206/315.2, 206/315.4, 457; D21/754; 700/119
See application file for complete search history.

(56) References Cited

U.S. PATENT DOCUMENTS

| | | | |
|---|---|---|---|
| 3,133,577 A | 5/1964 | Bellevue, Sr. | |
| 3,255,794 A | 6/1966 | Morse | |
| 4,667,716 A | 5/1987 | Solheim et al. | |
| 5,337,670 A | 8/1994 | Huang | |
| 5,722,132 A * | 3/1998 | Jones | A43C 7/00 24/712.1 |
| D403,727 S | 1/1999 | Colinelli | |

(Continued)

FOREIGN PATENT DOCUMENTS

| | | |
|---|---|---|
| JP | 2962716 B1 | 10/1999 |
| JP | 2009-034335 A | 2/2009 |

*Primary Examiner* — Fenn C Mathew
*Assistant Examiner* — Cynthia Collado
(74) *Attorney, Agent, or Firm* — Glenn E. Gold, P.A.; Glenn E. Gold; David Colls (57) ABSTRACT

A sporting equipment cover consisting of a custom three-dimensional printed figurehead attached to a cover portion. The printed figurehead is fabricated from a three-dimensional scanned image of an individual using a three-dimensional ink jet printing process. The printed figurehead can be coated with one or more layers of a clear protective coating to increase the longevity of the printed figurehead. A mounting flange is formed about a mounting edge of the three-dimensional printed figurehead. The mounting flange is attached to the cover portion using a mounting bracket, a mechanical fastener, or other fastening interface. The cover portion can be designed to cover any sporting equipment, including golf clubs, racquets, etc. Alternatively, the printed figurehead can be a complete head and attached using a bobble head styled interface.

7 Claims, 10 Drawing Sheets

(56) References Cited

U.S. PATENT DOCUMENTS

| | | | | |
|---|---|---|---|---|
| 5,908,344 A | * | 6/1999 | Kociemba | A63B 60/62 150/160 |
| D417,899 S | * | 12/1999 | Sloan | D21/623 |
| 6,113,457 A | | 9/2000 | Kociemba | |
| 6,227,269 B1 | | 5/2001 | Choe | |
| 6,230,886 B1 | | 5/2001 | Bradshaw | |
| 6,398,025 B2 | | 6/2002 | Choe | |
| 6,431,233 B1 | | 8/2002 | Malkoff | |
| D465,821 S | * | 11/2002 | Pontiff | D21/754 |
| D466,172 S | | 11/2002 | Pontiff | |
| D466,568 S | | 12/2002 | Pontiff | |
| D466,572 S | | 12/2002 | Pontiff | |
| D468,384 S | | 1/2003 | Harkins | |
| 6,571,947 B1 | | 6/2003 | Rogers | |
| D506,519 S | * | 6/2005 | McCabe | D21/754 |
| D508,100 S | * | 8/2005 | McCabe | D21/754 |
| D516,150 S | * | 2/2006 | McCabe | D21/754 |
| D517,627 S | * | 3/2006 | McCabe | D21/754 |
| 7,152,524 B2 | | 12/2006 | Davidson | |
| 7,526,997 B2 | | 5/2009 | Davidson | |
| 2001/0035243 A1 | | 11/2001 | Choe | |
| 2003/0173009 A1 | | 9/2003 | Choe | |
| 2004/0026280 A1 | | 2/2004 | Herold | |
| 2004/0206433 A1 | * | 10/2004 | Kim | A63B 60/62 150/160 |
| 2007/0000584 A1 | | 1/2007 | Reynolds et al. | |
| 2007/0102082 A1 | | 5/2007 | Scott | |
| 2009/0153552 A1 | | 6/2009 | Fidaleo et al. | |
| 2011/0031143 A1 | * | 2/2011 | Lindeman | A63B 55/00 206/315.4 |
| 2011/0204595 A1 | * | 8/2011 | Fox | B60D 1/60 280/507 |
| 2011/0222081 A1 | * | 9/2011 | Yi | G06T 17/00 358/1.9 |
| 2011/0265248 A1 | * | 11/2011 | Hunt-Martin | A42B 3/046 2/209.13 |

\* cited by examiner

CUSTOMIZABLE SPORTING EQUIPMENT COVER AND METHOD OF MANUFACTURE

CROSS-REFERENCE TO RELATED APPLICATION

This Non-Provisional Utility application claims the benefit of U.S. Provisional Patent Application Ser. No. 61/474,533, filed on Apr. 12, 2011, which is incorporated herein in its entirety.

FIELD OF THE INVENTION

The present disclosure generally relates to a sporting goods cover having a customized figurehead attached thereto and a method of manufacturing the apparatus. More specifically, the figurehead is fabricated replicating an individual or animal using a three-dimensional printing machine and attaching the custom fabricated figurehead to a sporting goods cover.

BACKGROUND OF THE INVENTION

Sporting equipment is commonly protected by a cover when not in use. Several examples include covers for golf club heads, tennis racquets, and the like. The covers are offered for sale to consumers in a variety of designs, colors, and materials to distinguish the covers from other available covers. The covers are fabricated of a material, such as fabric, vinyl, leather, a knit, plastic, a composite, and the like.

Sportspersons have a tendency to personalize their equipment. This includes locating a cover or series of covers that compliment the personality of the sportsperson. The sporting equipment covers currently offered are manufactured using common production techniques resulting in a potential for two sportspeople having the same covers.

An exemplary method of personalizing a sporting equipment cover is to monogram the covers.

Therefore, a manufacturing process and resulting sporting equipment covers that are unique and personalized is highly desired.

SUMMARY OF THE INVENTION

The present disclosure is generally directed to adorned covers for sports equipment, including but not limited to golf club covers, tennis racquet covers, and the like.

A first aspect of the present invention provides a cover assembly for removably covering a distal end of an individual handheld sports equipment item used to strike an object that is independent of the individual handheld sports equipment item during the playing of a corresponding sport, the cover assembly displaying at least a portion of a three-dimensional face and head closely resembling a corresponding preselected actual human face and head or an animal face and head, the cover assembly comprising:

a flexible first covering constructed for being snugly fitted over said distal end of said individual handheld sports equipment item;

a unitary three-dimensional article comprised of a plurality of successively joined particles of material in the form of said corresponding three-dimensional face and head constructed from data of a three-dimensional digital computer file digitally representative of said preselected actual human or animal face and head, such that a front facial portion thereof is contoured to conform with facial features and contours of said corresponding preselected actual human or animal face and head, said unitary three-dimensional article formed in accordance with said three-dimensional digital computer file representation of said preselected actual human or animal head; and a mechanical attachment interface for attaching said unitary three-dimensional article to an exterior surface of said flexible first covering, such that said unitary three-dimensional article is prominently displayed when said sports equipment cover assembly covers said distal end of said individual handheld sports equipment item.

In a second aspect, the custom three-dimensional figurehead is fabricated using any three-dimensional rapid prototyping machine to provide a custom three-dimensional figurehead representative of the three-dimensional object. The three-dimensional object can be scanned, computer generated, and the like.

In another aspect, the custom three-dimensional figurehead is fabricated using an inkjet three-dimensional printing machine to provide a custom three-dimensional figurehead having a color pattern matching the scanned three-dimensional object.

In another aspect, the custom three-dimensional figurehead can be fabricated replicating a facial portion of an individual.

In another aspect, the custom three-dimensional figurehead can be fabricated replicating a facial portion of an animal.

In another aspect, the attachment interface utilizes a plurality of mechanical fasteners. It is understood that any mechanical fastener can be utilized. The mechanical fasteners can be selected from an exemplary group of mechanical fasteners; the exemplary mechanical fasteners group comprising grommets, rivets, dense hook and loop tape, adhesive, and ultrasonic welding.

In another aspect, the attachment interface can utilize a mechanical coupling interface such as a mounting flange and a respective mounting bracket.

In another aspect, the mechanical coupling interface can be provided having an inverted "U" shape.

In another aspect, the mounting flange can be integrated into a unitary construction of the custom three-dimensional printed figurehead.

In another aspect, the custom three-dimensional figurehead can be fabricated replicating a complete head of an individual.

In another aspect, the custom three-dimensional figurehead can be fabricated replicating a complete head of an animal.

In another aspect, the custom three-dimensional figurehead can be attached to the cover portion using a spring resembling a bobble head.

In another aspect, the lifespan of the custom three-dimensional figurehead can be enhanced by applying one or more coatings of a protective material thereon. The preferred embodiment would be a clear coating.

In another aspect, the protective coating can be applied using a spray application, a dipping application, a brushed application, or the like.

In another aspect, the figurehead can comprise a complete hollow head, including a facial portion, a rear portion, and a cavity therein for receiving a golf club or other sports equipment.

In another aspect, the facial portion and the rear portion can be hingeably attached.

In another aspect, the facial portion and the rear portion can be two separate components that are detachably latched together via a mechanical interface.

In another aspect, a filler material is disposed within an interior of the complete hollow head. The filler material can be shaped to receive a specifically shaped golf club head (or other sporting equipment device) or be fabricated of a pliant material capable of conforming to the subject equipment.

In another aspect, the figurehead can be shaped and colored using any shaping and coloring processes. Examples of methods include: hand carving and hand painting, machine carving, three-dimensional printing, and the like. The customer would submit one or more color images of a desired head. The figurehead would be shaped and colored in a likeness of the submitted images. The figurehead would be adapted to act as a protective and/or decorative portion of a sporting goods equipment cover.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A golf club cover assembly 240 or any other sporting equipment cover can be ornated by the attachment of a custom three-dimensional printed figurehead 200. The exemplary custom three-dimensional printed figurehead 200 is fabricated using a three-dimensional printed figurehead shaped and colored replicating an individual's face. The custom three-dimensional printed figurehead 200 would include common facial features, including a pair of eyes, a nose, a mouth, a chin, cheeks, a forehead, a lower jaw line, eyebrows, hair, and optionally a pair of ears, depending on the desired percentage of the face to be modeled.

Figure 8:
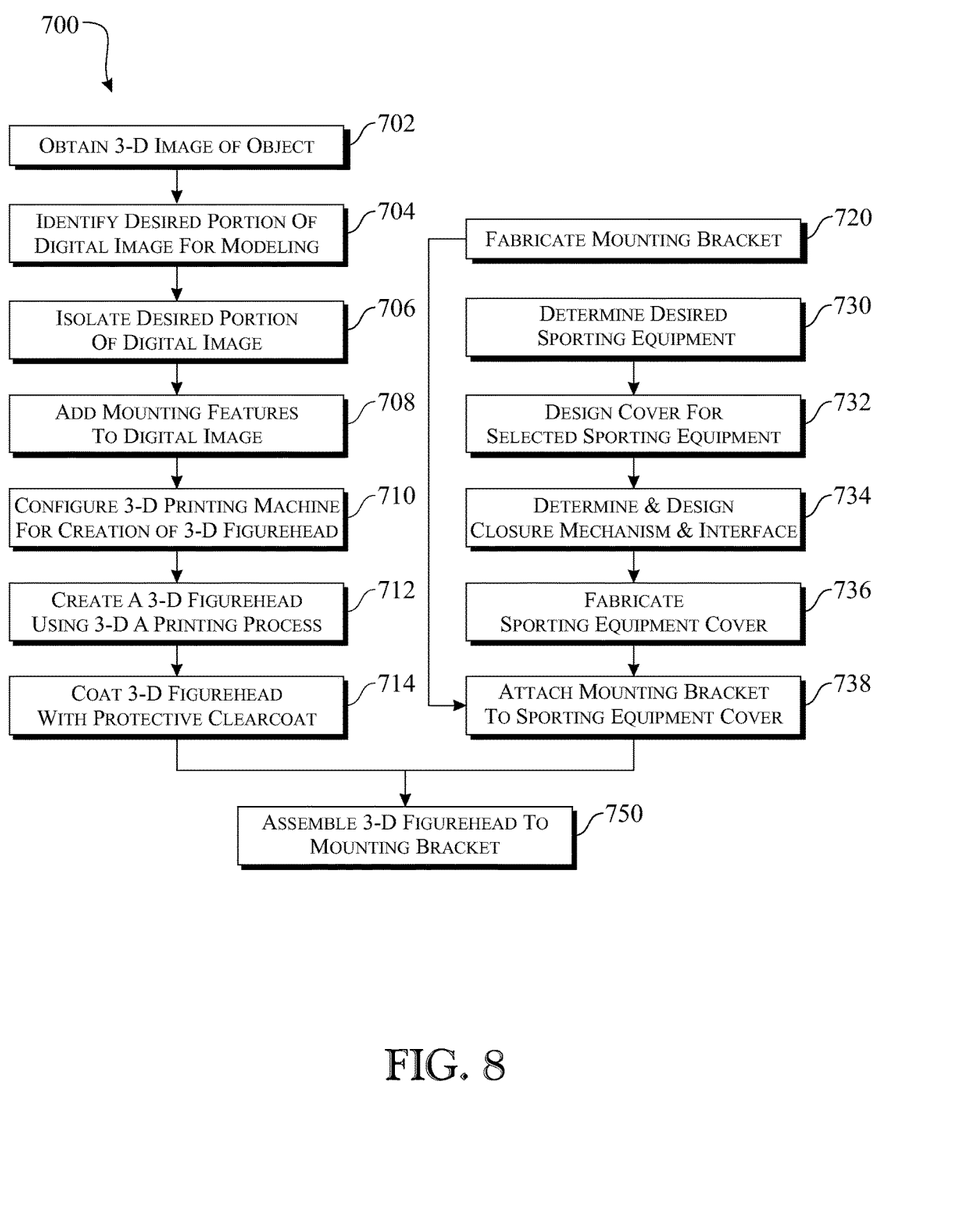
FIG. 8 presents a flow diagram representing an exemplary manufacturing process.

The fabrication process of the custom three-dimensional printed figurehead 200 is detailed in the exemplary custom three-dimensional figurehead adorned sporting equipment cover flow diagram 700 presented in FIG. 8. The fabrication process is additionally illustrated in the exemplary block diagram presented in FIG. 1. The fabrication process initiates with a step of obtaining a three-dimensional digital image of an individual's face or head (block 702). The data can be obtained using any three-dimensional scanner or by converting one or more pictures into a three-dimensional digital format. The pictures can be scanned or entered in any other manner into a system, where software receives the images, digitizes the images, and utilizes the digitized information to generate a database representative of a three-dimensional object. The designer determines the desired portion of the three-dimensional digital object that is to be modeled and affixed to a golf club cover 250 of a golf club cover assembly 240 (block 704). The database for the three-dimensional digital object is digitally modified to isolate the desired portion of the three-dimensional digital object to be modeled (block 706). The three-dimensional digital object can be modeled as a solid object or hollowed where the contour of the object is formed upon a shell. The wall thickness of the shell can be adjusted for longevity and reliability considerations. The modified three-dimensional digital object is then perfected for assembly to the golf club cover 250 by adding a figurehead mounting feature 220 to a mounting edge of the modified three-dimensional digital object (block 708). The perfected three-dimensional digital object is configured into a print directing digital format and transferred to a three-dimensional printing machine 100 (block 710).

The three-dimensional printing machine 100 creates the custom three-dimensional printed figurehead 200 using a three-dimensional printing process (block 712), such as via a three-dimensional inkjet printer. Although other three-dimensional printing processes can be employed, inkjet printing offers some additional benefits and is therefore presented herein as an exemplary embodiment. Ink jet printing was developed utilizing printer and plotter technique involves shooting tiny droplets of ink on paper to produce graphic images. Rapid prototyping ink jet techniques utilize ink jet technology to shoot droplets of liquid-to-solid compound and form a layer of a rapid prototyping model. Several common ink jet printing techniques include Sanders ModelMaker™, Multi-Jet Modeling™, Z402 Ink Jet System™, and Three-Dimensional Printing. The created custom three-dimensional printed figurehead 200 is then coated with a protective layer or a plurality of layers of a protectant (block 714). The protectant can be any coating that is compatible with the material and coloring inks of the printed custom three-dimensional printed figurehead 200. The preferred embodiment would apply at least one layer of a clear protectant. The coating may be applied using a spray on process, a dipping process, a brush on process, or the like.

Figure 1:
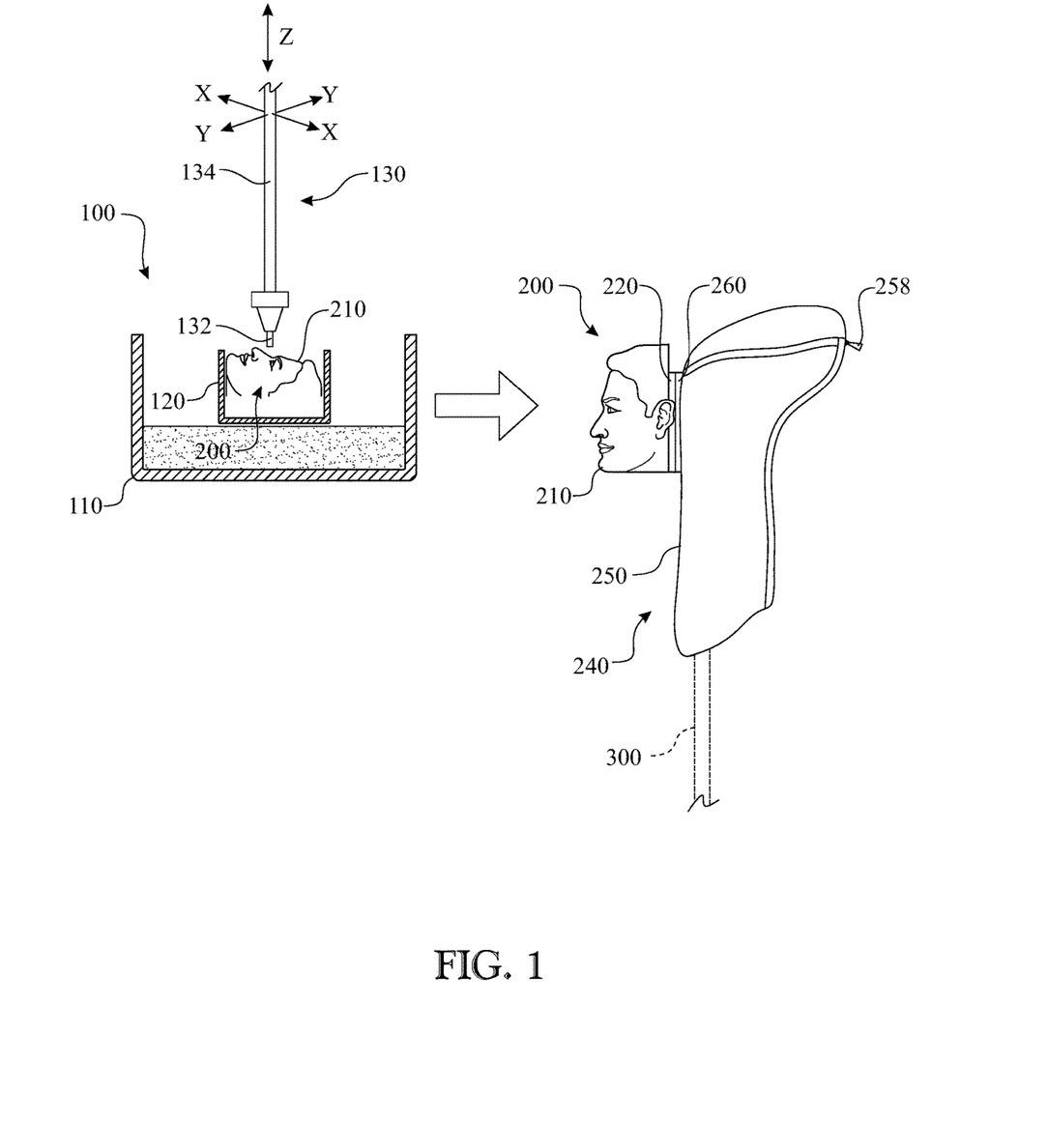
FIG. 1 presents an exemplary block diagram representing a manufacturing process for fabricating a sports equipment cover having a custom three-dimensional printed figurehead.

The three-dimensional printing machine 100 includes a print head assembly 130. The print head assembly 130 includes a print head 132 carried by a print head controller 134. The print head controller 134 is programmably positioned along an X-axis and a Y-axis by any reasonable positioning system. The print head controller 134 can be programmably positioned along a Z-axis when necessary for creating the custom three-dimensional printed figurehead 200. A work piece support tray 120 is placed upon or within a printing machine base 110. The print head 132 shoots droplets of a liquid-to-solid compound onto material contained within the work piece support tray 120. The droplets of a liquid-to-solid compound combine with the powder contained within a work piece support tray 120 to build up and form the custom three-dimensional printed figurehead 200. The process includes and injects a coloring medium during the printing process, allowing the generation of a colored three-dimensional likeness of the scanned individual's face or head. The fabrication process creates various printed figurehead facial features 210 upon the custom three-dimensional printed figurehead 200. The design and fabrication process additionally integrates a figurehead mounting feature 220 with the custom three-dimensional printed figurehead 200. In the exemplary embodiment, the figurehead mounting feature 220 is formed in a shaped of a mounting flange 222. It is understood that the three-dimensional printing machine 100 can include a plurality of print head assemblies 130 and respective work piece support trays 120 for fabricating a respective plurality of custom three-dimensional printed figureheads 200. The print head assemblies 130 can be controlled individually or in unison to replicate a plurality of the same design or create a series of unique designs simultaneously.

Alternative three-dimensional rapid prototyping processes can be utilized to create the custom three-dimensional printed figurehead 200. These can include stereolithography (SLA), selective laser sintering (SLS), fused deposition modeling (FDM), laminated object manufacturing (LOM), and electron beam melting (EBM). It is understood that each of these processes has advantages and disadvantages that would be considered when determining the actual process used. An example of an available machine for accomplished the manufacturing task for fabricating the custom three-dimensional printed figurehead 200 is the Designjet 3D. The Designjet 3D is based on Stratasys's Fused Deposition Modeling (FDM) technology, which turns three-dimensional CAD drawings into tangible prototypes by extruding partially molten ABS plastic in extremely fine layers one atop the other, forming the entire 3-D model in a single piece from the ground up. The equipment is offered in a standard model, which prints in ivory-colored plastic and a color version, which is capable of printing single-color parts in up to eight different colors.

A golf club cover assembly 240 is fabricated during a separate process (blocks 730, 732, 734, 736, 738). The golf club cover assembly 240 comprises a mounting bracket 260 attached to a golf club cover 250. Initially, the manufacturing company determines the sporting equipment that the manufacturer will be offering golf club cover assemblies 240 for (block 730). The golf club cover assemblies 240 are designed respective to the selected sporting equipment (block 730). The designer considers the shapes; sizes, colors, materials, and the like for the golf club cover assembly 240. The designer considers a form factor and integration design for a closure 258 (block 734). In the exemplary illustration, the closure 258 is a zipper. Those practiced in the art will understand that any closure 258 can be utilized, including a dense hook and loop tape interface, a frog and loop closure, a hook and eye closure, a tie, a button and buttonhole, and the like.

Upon conclusion of the design phase of the golf club cover assembly 240, the manufacturer fabricates the golf club cover assembly 240 accordingly (block 736). Any manufacturing process suited for the design can be utilized to fabricate the golf club cover assembly 240. This includes sewing, adhesive, molding, riveting, grommets, ultrasonic welding, and the like, and any combination thereof.

The mounting bracket 260 is designed to mate with the figurehead mounting feature 220. The mating between the figurehead mounting feature 220 and mounting bracket 260 can be permanent or removable allowing the consumer the ability to change the custom three-dimensional printed figurehead 200 as desired. The mounting bracket 260 is fabricated in accordance with any manufacturing means capable of creating mounting bracket 260 that is suited to mate with the figurehead mounting feature 220 (block 720). In the exemplary embodiment, the mounting bracket 260 is shaped to engage with the mounting flange 222. The mounting bracket 260 is preferably fabricated using a plastic injection molding process. Those practiced in the art can appreciate the mounting bracket 260 can be fabricated of any reasonable material and respective manufacturing process. The completed mounting bracket 260 are generally fabricated in bulk and transferred to a location for assembly to the golf club cover 250. The mounting bracket 260 can be attached to the golf club cover 250 using any attachment mechanism, including adhesive, stitching, grommets, rivets, and the like. The attachment mechanism is selected based upon comfort to the user, cost, ease of assembly, compatibility with the interface between the figurehead mounting feature 220 and the mounting bracket 260, and the like.

The finished custom three-dimensional printed figurehead 200 is attached to the finished golf club cover 250 by engaging the figurehead mounting feature 220 and the mounting bracket 260 together. The interface between the figurehead mounting feature 220 and the mounting bracket 260 can be made permanent with the inclusion of an adhesive, a mechanical fastener, and the like. Alternatively, the figurehead mounting feature 220 can be removably attached from the mounting bracket 260 with the inclusion of a temporary restraining feature such as a detent, a biased latch, and the like.

Figure 2:
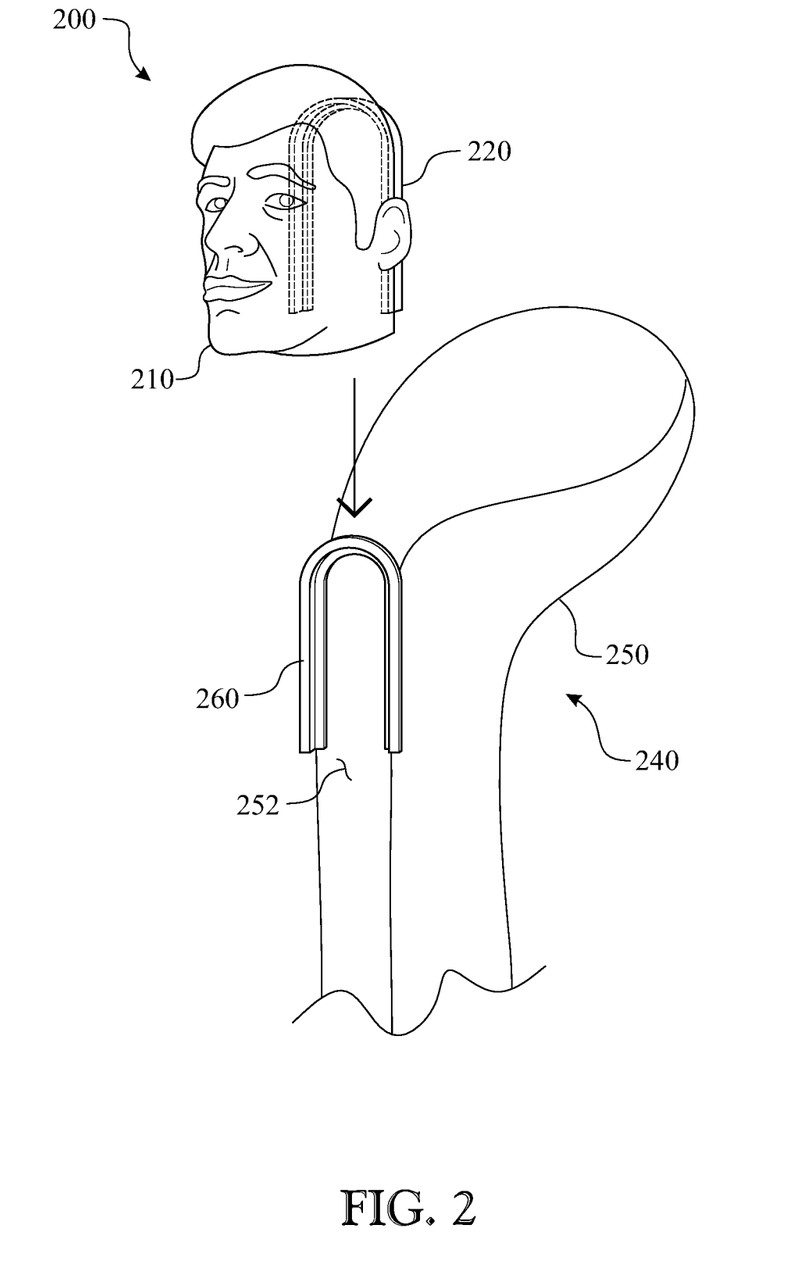
FIG. 2 presents an isometric view detailing an exemplary assembly process for assembling the custom three-dimensional printed figurehead to a first exemplary location upon the sports equipment cover portion.
Figure 3:
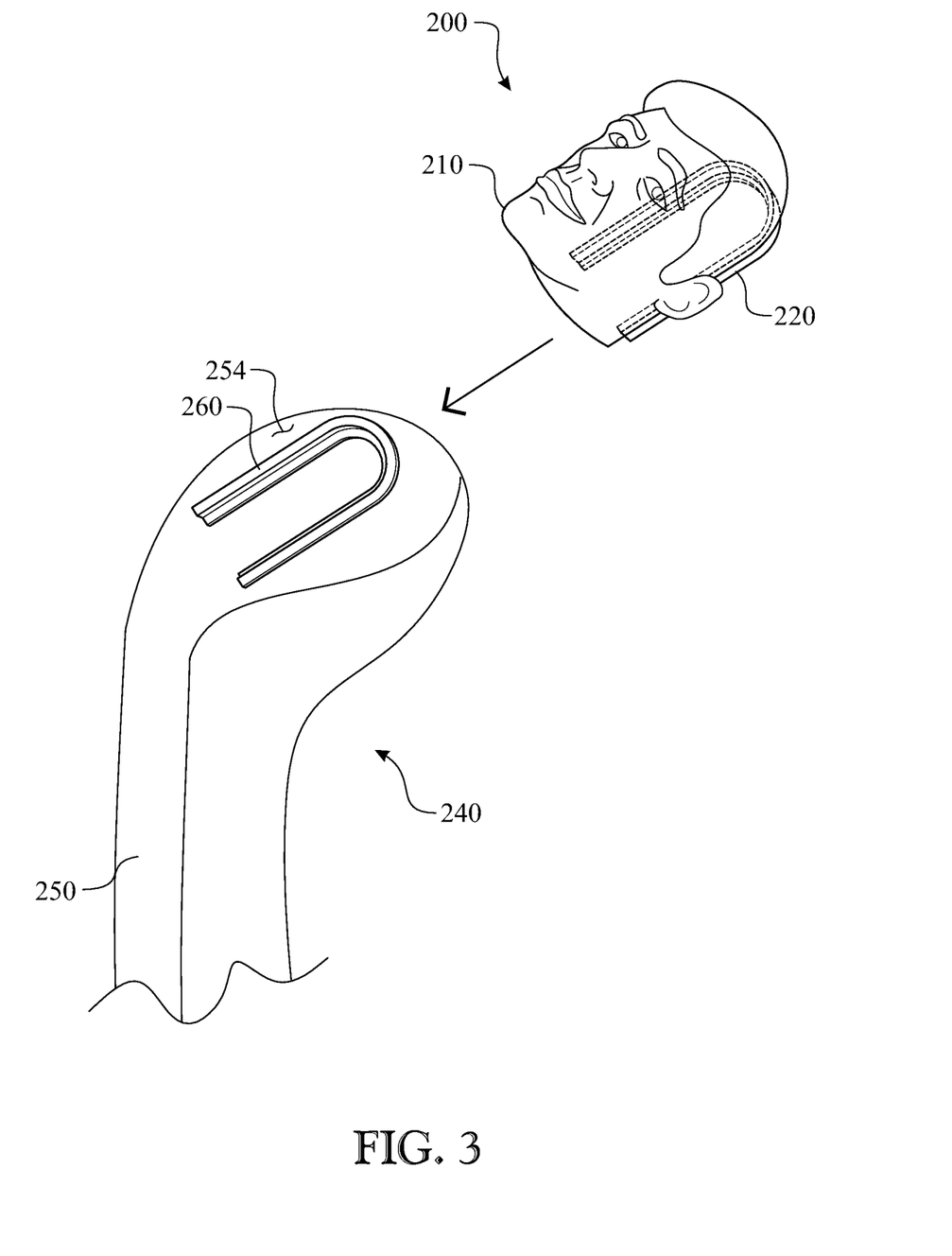
FIG. 3 presents an isometric view detailing an exemplary assembly process for assembling the custom three-dimensional printed figurehead to an alternative exemplary location upon the sports equipment cover portion.

Details of the present invention and design alternatives are presented in FIGS. 1 through 7. The custom three-dimensional printed figurehead 200 can be assembled to any reasonable location on the golf club cover 250. A first exemplary location is a vertical planar surface 252 of the golf club cover 250 as illustrated in FIG. 2. A second exemplary location is an upper planar surface 254 of the golf club cover 250 as illustrated in FIG. 3.

Figure 4:
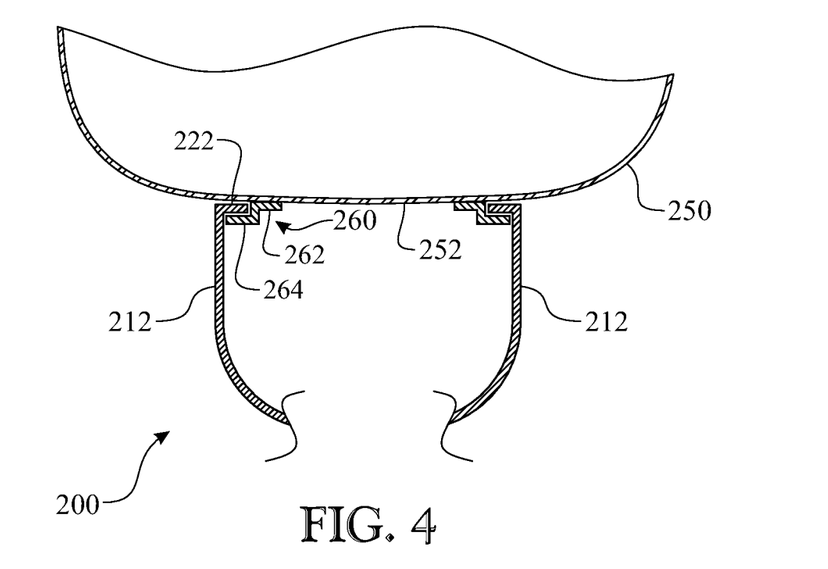
FIG. 4 presents a sectioned top view detailing a first exemplary assembly interface for assembling the custom three-dimensional printed figurehead to the sports equipment cover portion.

The assembly of the custom three-dimensional printed figurehead 200 to the golf club cover 250 can be accomplished using any reasonable assembly interface. A mounting flange 222 is integrated into the shape of the custom three-dimensional printed figurehead 200, wherein the exemplary mounting flange 222 extends inward from a mounting edge of a figurehead sidewall 212 of the custom three-dimensional printed figurehead 200. In a first exemplary assembly interface, the mounting flange 222 is secured to the golf club cover 250 using the mounting bracket 260 as illustrated in FIG. 4. The exemplary mounting bracket 260 is formed in a modified "Z" shape, including a mounting bracket cover attachment flange 262 for attachment to the attachment surface 252 and a mounting bracket figurehead attachment flange 264 for engagement with the mounting flange 222. Although the exemplary mounting bracket 260 is illustrated in an inverted "U" shape, the mounting bracket 260 can be provided in any continuous shape or provided in a plurality of segmented sections suitable for receiving the mounting flange 222.

It is understood that the custom three-dimensional printed figurehead 200 can be any reasonable size respective to the golf club cover 250. The custom three-dimensional printed figurehead 200 can be shaped to optimize form, fit, function, and flow with the golf club cover 250.

Figure 5:
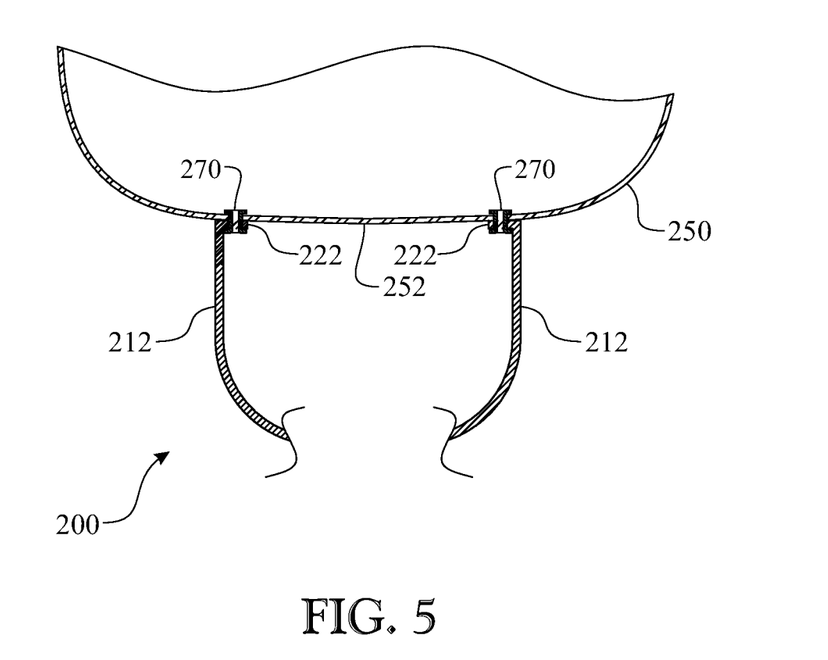
FIG. 5 presents a sectioned top view detailing a second exemplary assembly interface for assembling the custom three-dimensional printed figurehead to the sports equipment cover portion.
Figure 6:
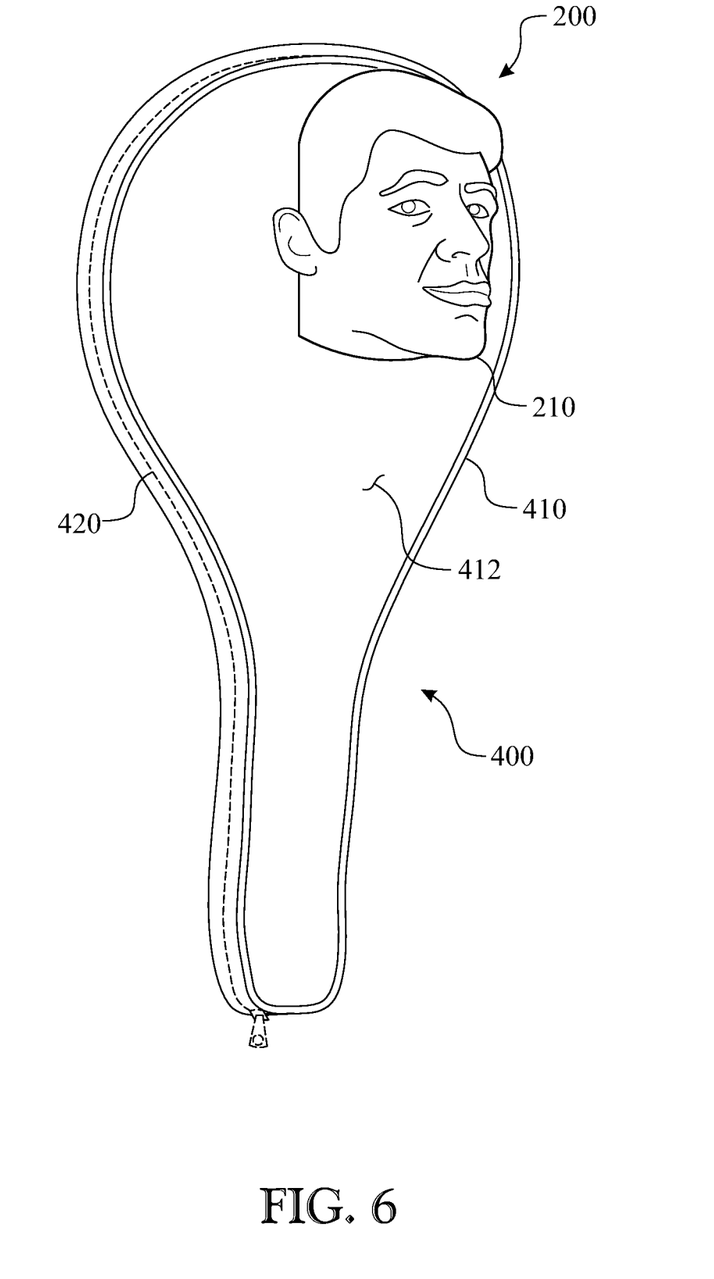
FIG. 6 presents an isometric view of an alternate exemplary sports equipment cover having the custom three-dimensional printed figurehead carried thereon.

An alternative to the engaging mechanical interface would be an attachment fastener as presented in the exemplary illustration shown in FIG. 5. An attachment fastener 270 can be inserted through the golf club cover 250 and an aperture provided through the mounting flange 222 to permanently attach the custom three-dimensional printed figurehead 200 to the attachment surface 252. Although the exemplary attachment fastener 270 is a grommet, it is understood that the attachment fastener 270 can be any reasonable mechanical interface, including rivets, adhesive, dense hook and loop tape interface, and the like.

The initial illustrations present a golf club cover assembly 240 for use with a golf club 300. The present invention can be adapted to a cover design for use with any sporting equipment having a surface suited for receiving the custom three-dimensional printed figurehead 200. A second exemplary embodiment is a racquet cover assembly 400, illustrated in FIG. 6. The racquet cover assembly 400 includes a racquet cover 410 having an attachment surface 412. A cover closure 420 is integrated into the racquet cover 410 providing a means for adapting the racquet cover assembly 400 for insertion of at least a portion of the sporting equipment therein, and subsequently securing the racquet cover assembly 400 thereto. In the exemplary illustration, the cover closure 420 is a zipper. Those practiced in the art will understand that any closure 420 can be utilized, including a dense hook and loop tape interface, a frog and loop closure, a hook and eye closure, a tie, a button and buttonhole, and the like. The custom three-dimensional printed figurehead 200 is attached to the attachment surface 412 using any of the attachment interfaces presented in the golf club cover embodiment previously described herein.

Figure 7:
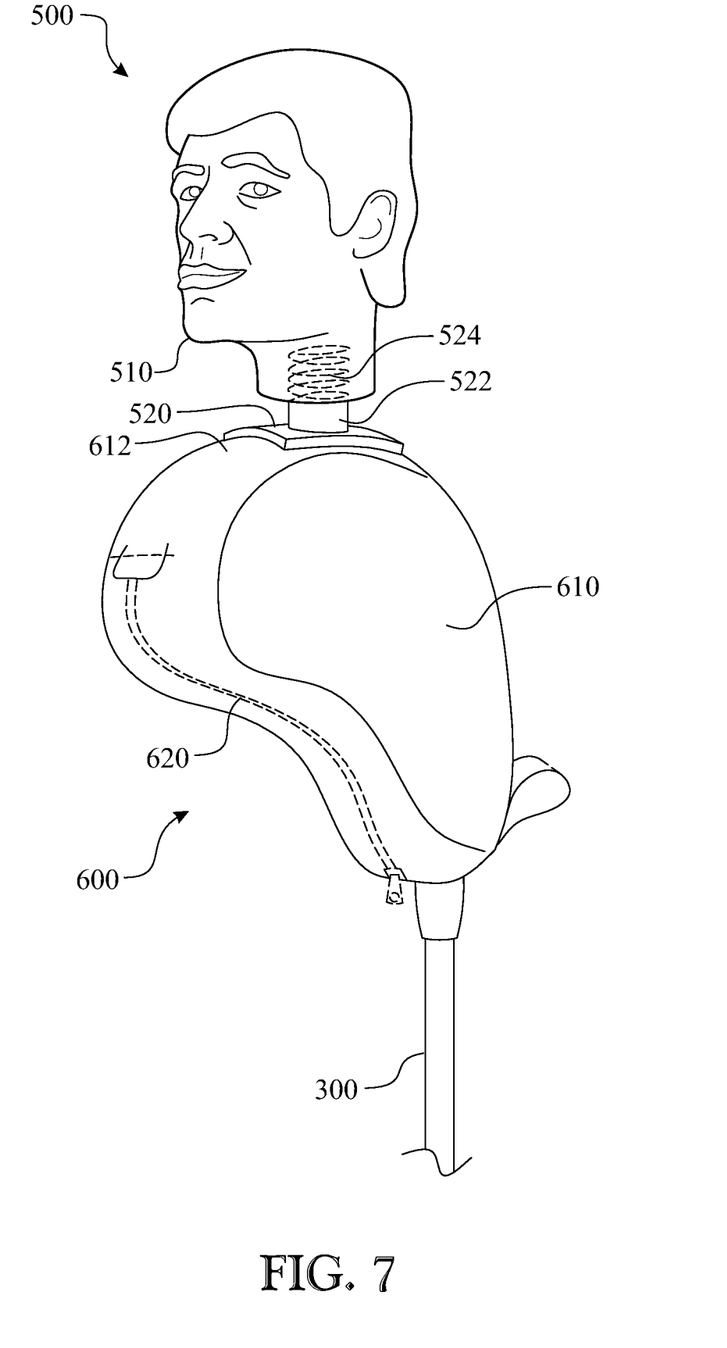
FIG. 7 presents an isometric view detailing an exemplary assembly interface for assembling the custom three-dimensional printed figurehead to the sports equipment cover portion utilizing a bobble head interface.

The above presented embodiments present a custom three-dimensional printed figurehead 200 being rigidly fixed to the cover 250, 410. In an alternative embodiment, a custom three-dimensional printed figurehead 500 can be moveably attached to a golf club head cover 610 using a spring 524 as illustrated in FIG. 7. Since the mounting interface extends from a base section of the head, the custom three-dimensional printed figurehead 500 is fabricated replicating an entire head, including printed figurehead facial features 510 representative of the individual's face, and preferably including a portion of the individual's neck. Although it is preferred to use a replication of an entire head, it is understood that the custom three-dimensional printed figurehead 500 can be fabricated including any reasonable portion thereof.

The golf club head cover assembly 600 is fabricated including a cover closure 620 integrated into a golf club head cover 610, similarly to the golf club cover assembly 240 previously presented. The golf club head cover 610 includes a figurehead attachment surface 612 for attachment of the custom three-dimensional printed figurehead 500. A spring mount base 520 includes a spring attachment feature 522. The spring mount base 520 is attached to the figurehead attachment surface 612 using any reasonable attachment means, including adhesive, mechanical fasteners, and the like. A spring 524 provides a moveable assembly interface between the custom three-dimensional printed figurehead 500 and the spring attachment feature 522 creating a bobble head effect.

Figure 9:
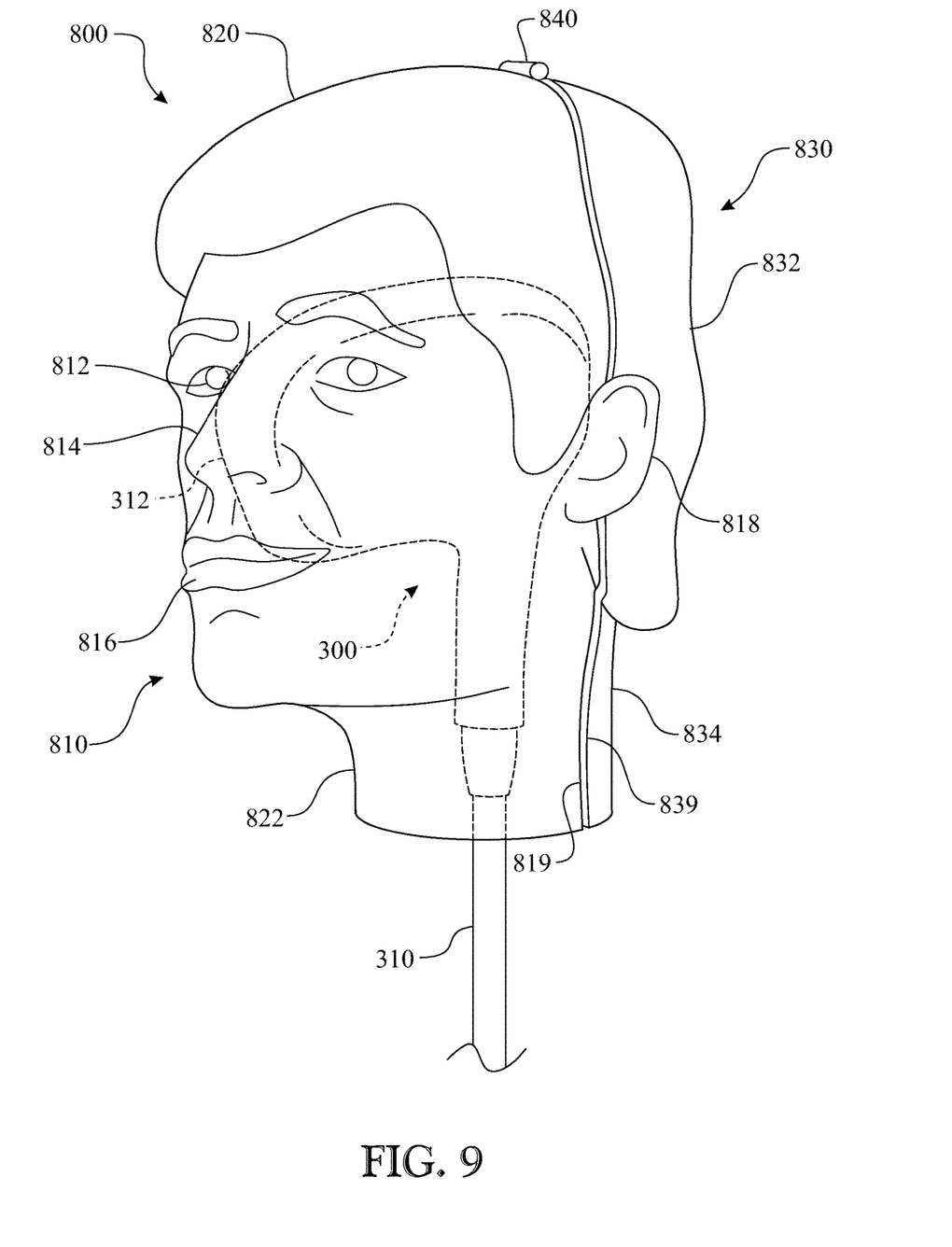
FIG. 9 presents an isometric view of another exemplary sports equipment cover utilizing a complete figurehead, the figurehead being sectioned into a facial section and a rear section.
Figure 10:
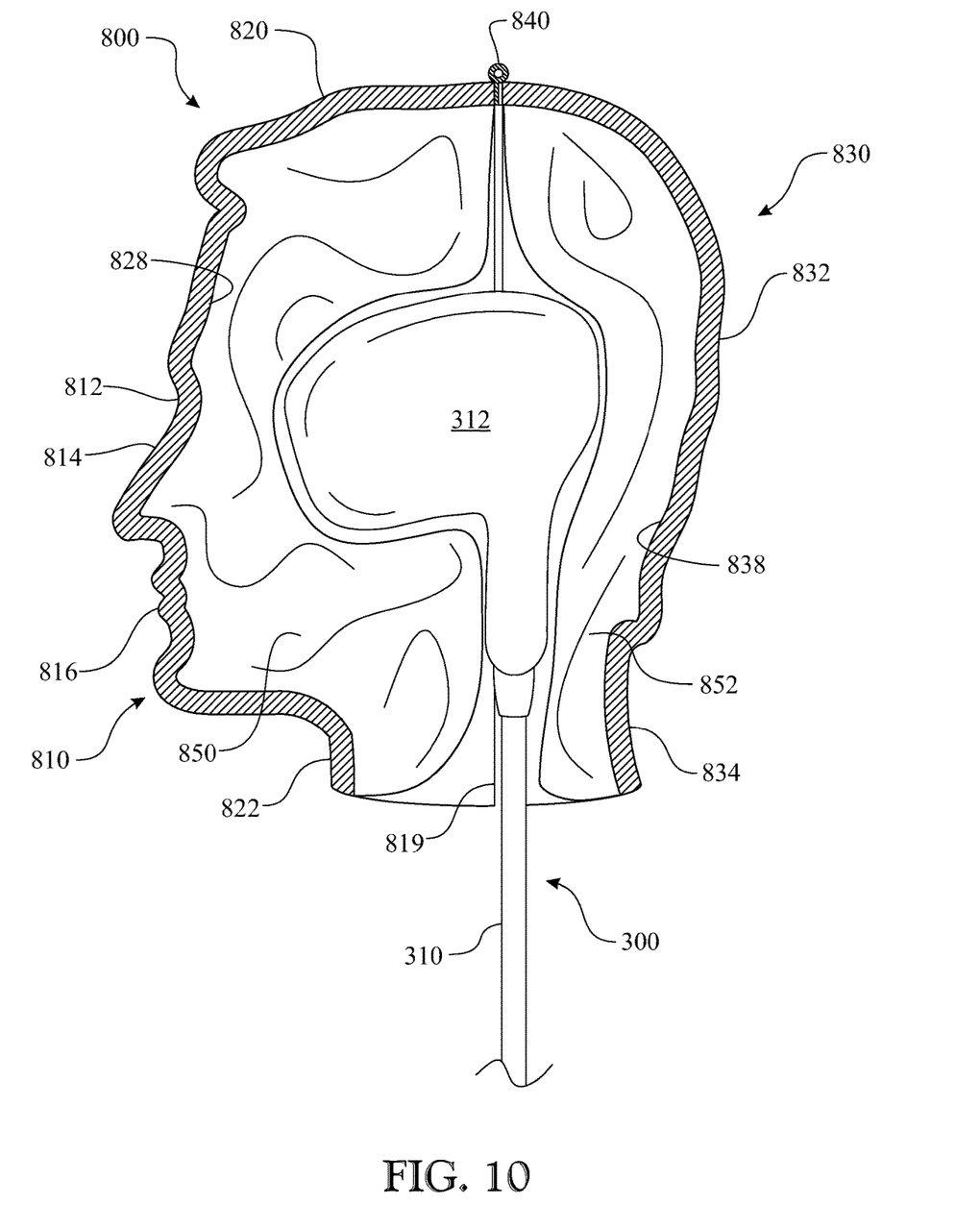
FIG. 10 presents a side sectioned view of the sports equipment cover introduced in FIG. 9.
Figure 11:
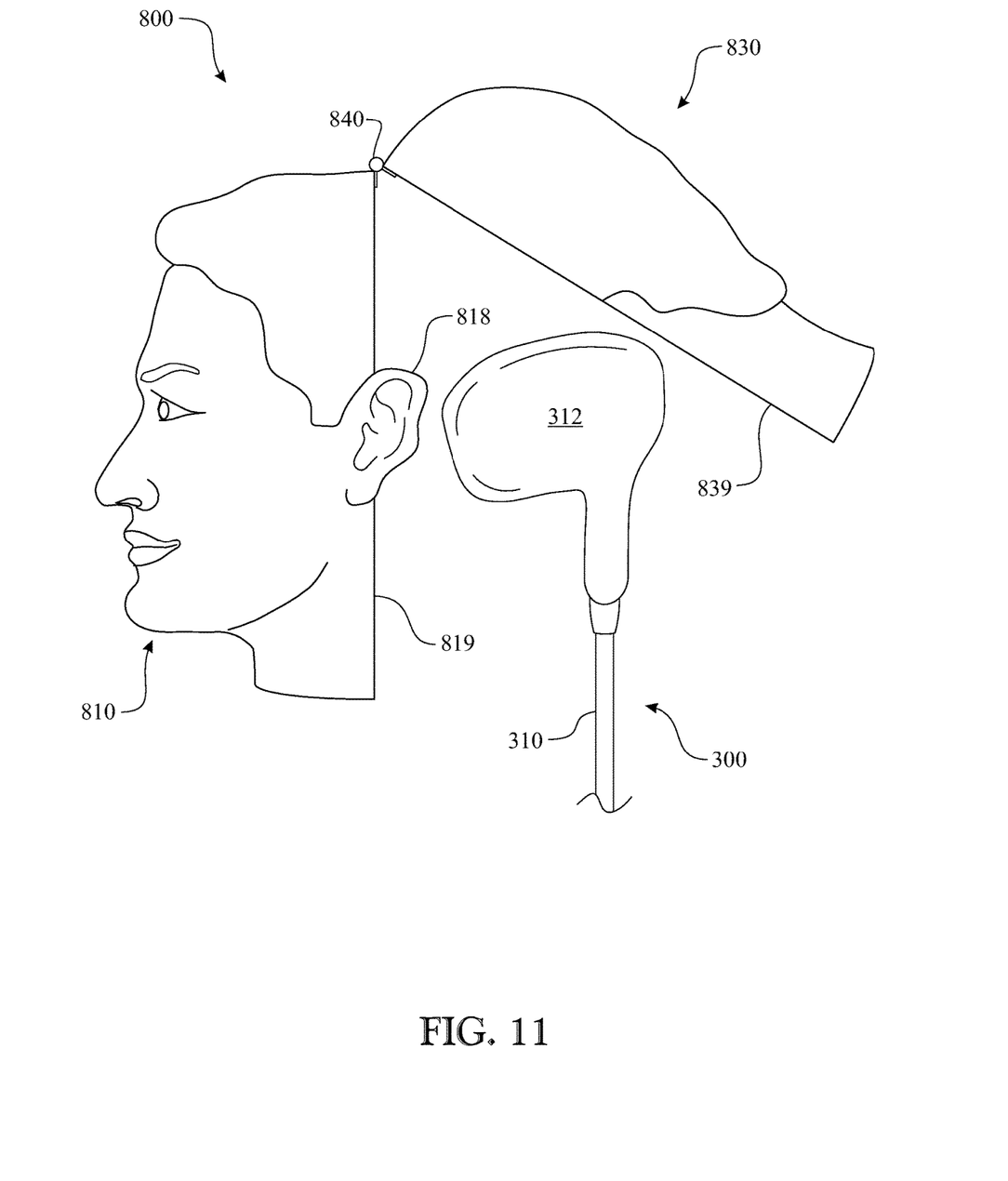
FIG. 11 presents a side view of the sports equipment cover introduced in FIG. 9, the illustration demonstrating one exemplary opening element.

Another exemplary embodiment is referred to as an encapsulating figurehead club cover 800, which is shown in an isometric view of a storage configuration in FIG. 9, a side sectioned view of a stored configuration in FIG. 10, and a side view of an opened configuration in FIG. 11.

The encapsulating figurehead club cover 800 is fabricated having a figurehead facial portion 810 and a figurehead rear portion 830. The figurehead facial portion 810 and figurehead rear portion 830 are shaped using the three-dimensional printing machine 100 as described above or any other known custom shaping process. The shaping process would create common facial features onto the figurehead facial portion 810, including a pair of figurehead eyes 812, a figurehead nose 714, figurehead lips 816, and a pair of figurehead ear 818. A frontal neck section 822 is preferably incorporated into the design, wherein the frontal neck section 822 extends downward providing an extension for partially covering portions of the golf club shaft 310 of the golf club 300. This can provide additional support to the encapsulating figurehead club cover 800 and protection to the golf club 300. Additional features, such as cheeks, a chin, a forehead, and the like would also be shaped onto the figurehead facial portion 810 accordingly. Figurehead hair 820, including facial hair, would be included in the process. It is noted that the software may generate a fabrication routine based upon the facial features 812, 814, 816, 818 and hair 820 using separate routines. The figurehead rear portion 830 would be shaped in a similar manner, including figurehead rear hair 832 and a rear neck section 834.

The figurehead facial portion 810 and the figurehead rear portion 830 can be shaped as a unitary structure and subsequently separated to provide unity between the two sections. The figurehead facial portion 810 and figurehead rear portion 830 would include a front portion mating edge 819 and a rear portion mating edge 839 respectively, wherein the figurehead facial portion 810 and the figurehead rear portion 830 mate along the front portion mating edge 819 and the rear portion mating edge 839. The front portion mating edge 819 and rear portion mating edge 839 can be separately joined in any manner known by those skilled in the art. In one exemplary joining configuration, the figurehead facial portion 810 and figurehead rear portion 830 can be pivotally attached by a connecting hinge 840 as shown. In the pivotal configuration, the connecting hinge 840 can be located at any reasonable location, wherein the exemplary embodiment locates the connecting hinge 840 along an upper mating edge. Another joining configuration can secure the front portion mating edge 819 and the rear portion mating edge 839 to one another using snap tabs. Yet another joining configuration can secure the front portion mating edge 819 and the rear portion mating edge 839 to one another using a section of a magnetized material and a mating section of magnetic material. Yet another joining configuration can secure the front portion mating edge 819 and the rear portion mating edge 839 to one another using a section of strapping material such as a ribbon comprising a dense hook and loop tape.

The figurehead facial portion 810 and figurehead rear portion 830 are fabricated having a hollowed interior volume for receiving and encasing a golf club head 312. The hollowed interior volume of the figurehead facial portion 810 is defined by a figurehead facial portion interior surface 828. The hollowed interior volume of the figurehead rear portion 830 is defined by a figurehead rear portion interior surface 838. A frontal portion filler material 850 can be inserted within the hollowed interior volume of the figurehead facial portion 810. Similarly, a rear portion filler material 852 can be inserted within the hollowed interior volume of the figurehead rear portion 830. The filler material 850, 852 can be provided in any of a variety of materials and shapes to support and protect the golf club head 312. In one embodiment, the filler material 850, 852 can be formed to contour to an exterior shape of the golf club head 312. In one embodiment, the filler material 850, 852 can be fabricated of a pliant material enabling the filler material 850, 852 to conform to the exterior shape of the golf club head 312. The filler material 850, 852 can be fabricated of foam, spun material (such as spun polyester), pliant plastic, formed plastic or nylon, and the like. It is understood that the filler material 850, 852 can include a spring, creating a bobble head effect upon the golf club head 312.

It is understood that alternate embodiments of the figurehead rear portion 830 can be utilized; wherein the figurehead rear portion 830 can be any shape and material suitable for partially or completely enclosing a rear portion of the encapsulating figurehead club cover 800. The rear portion can provide access to the interior void by any reasonable closure, including a zipper, a dense hook and loop tape, a magnetic closure, standard hook and loops, buttons and buttonholes, a tie closure, and the like. The figurehead rear portion 830 would be designed to optimize the ease of entry and removal of the golf club head 312 from the interior of the encapsulating figurehead club cover 800.

The exterior surface of the figurehead facial portion 810 and figurehead rear portion 830 are finished adding color to reflect the likeness of the individual. Any additional features may be added to the encapsulating figurehead club cover 800 as desired. One example would be an addition of actual or artificial hair.

The concept of the present invention provides a custom apparatus tailored towards an individual. The custom three-dimensional printed figurehead 200, 500, 800 can be of the individual, a family member, a friend, a pet or other animal, or the like. The three-dimensional ink jet printing process provides a manufacturing method, which replicates an object in a three-dimension model, including color. The process can create a one-off unique design to distinguish the sporting equipment cover 240, 400, 600 from any others. The fabrication of the custom three-dimensional printed figurehead 200, 500, 800 can be completed at retail locations such as kiosks.

Those practiced in the art will understand that the custom three-dimensional printed figurehead 200, 500, 800 can also be attached to any other object, including hand mirrors, hair brushes, key chains, school backpacks, hats, and the like. The custom three-dimensional printed figurehead 200, 500, 800 would be attached to the respective object in a manner suited for each individual application.

Those skilled in the art can appreciate that the three-dimensional figurehead 200, 500, 800 can be fabricated using other custom fabrication techniques. The three-dimensional figurehead 200, 500, 800 can be fabricated using automated machining or carving techniques, hand carving, and the like to replicate a three dimensional shape based upon an image or series of images. The interior space can be created by any known process to remove unwanted material from a mass of material. Alternatively, the three-dimensional figurehead 200, 500, 800 can incorporate the interior space during the fabrication steps.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A cover assembly for removably covering a distal golf head end of a golf club, the cover assembly displaying at least a portion of a three-dimensional face and head replicating a face and head of at least one of a corresponding preselected actual human being and an actual animal, the cover assembly comprising:
   a flexible first covering base substrate constructed for being snugly fitted over an exterior surface of said distal end of said golf club head, the base substrate having an exposed exterior surface;
   a unitary three-dimensional article having a front exterior surface area generally contoured to resemble corresponding surface contours and features of the face and head of said at least one actual human being and actual animal;
   said front exterior surface of said unitary three-dimensional article further comprising a visual depiction of a face and head precisely replicating a visual form of a digital image file of the face and head of said at least one actual human being and actual animal; and
   an attachment interface for attaching a rear exterior surface area of said unitary three-dimensional article to said exterior surface of said flexible first covering base substrate.

2. A cover assembly as recited in claim 1, the attachment interface further comprising:

a mechanical interface subassembly including a first interface subassembly portion fixedly attached to said exterior surface of said flexible first covering base substrate, and a second interface subassembly integrated with said three-dimensional article, wherein said first and second interface subassemblies are configured to selectively engage one another to attach said three-dimensional article to said flexible first covering base substrate.

3. A cover assembly as recited in claim 2, wherein the mechanical attachment interface further comprises at least one mechanical fastener.

4. A cover assembly as recited in claim 2, the mechanical attachment interface further comprising a spring.

5. A cover assembly as recited in claim 1, wherein said front exterior surface area of said unitary three-dimensional article is colored in accordance with a color layout of said preselected actual face and head.

6. A cover assembly as recited in claim 1, said unitary three-dimensional article further comprising a hollowed out interior forming an interior void.

7. A cover assembly as recited in claim 1, said unitary three-dimensional article further comprising at least one layer of clear protectant disposed upon an exterior surface thereof.

* * * * *